United States Patent
Musumeci et al.

(10) Patent No.: US 9,819,137 B2
(45) Date of Patent: Nov. 14, 2017

(54) TAPERING ENHANCED STIMULATED SUPERRADIANT AMPLIFICATION

(71) Applicants: THE REGENTS OF THE UNIVERSITY OF CALIFORNIA, Oakland, CA (US); RADIABEAM TECHNOLOGIES, LLC, Santa Monica, CA (US)

(72) Inventors: Pietro Musumeci, Los Angeles, CA (US); Joseph Duris, Los Angeles, CA (US); Alex Murokh, Encino, CA (US)

(73) Assignees: THE REGENTS OF THE UNIVERITY OF CALIFORNIA, Oakland, CA (US); RADIABEAM TECHNOLOGIES, LLC, Santa Monica, CA (US)

( * ) Notice: Subject to any disclaimer, the term of this patent is extended or adjusted under 35 U.S.C. 154(b) by 0 days.

(21) Appl. No.: 15/298,032

(22) Filed: Oct. 19, 2016

(65) Prior Publication Data
US 2017/0093113 A1    Mar. 30, 2017

Related U.S. Application Data

(63) Continuation of application No. PCT/US2015/027150, filed on Apr. 22, 2015.
(Continued)

(51) Int. Cl.
*H01S 3/09*     (2006.01)
*H01S 3/0955*   (2006.01)
*H01S 3/0959*   (2006.01)

(52) U.S. Cl.
CPC .......... *H01S 3/0903* (2013.01); *H01S 3/0955* (2013.01); *H01S 3/0959* (2013.01)

(58) Field of Classification Search
CPC ........ H01S 3/09; H01S 3/0903; H01S 3/0955; H01S 3/0959; G21K 1/00; G21K 1/06; G21K 1/093
See application file for complete search history.

(56) References Cited

U.S. PATENT DOCUMENTS

| 4,283,687 A | 8/1981 | Madey et al. |
| 4,438,513 A | 3/1984 | Elias et al. |

(Continued)

OTHER PUBLICATIONS

Korean Intellectual Property Office (KIPO), International Search Report and Written Opinion, issued Jul. 15, 2015, related PCT International Patent Application No. PCT/US2015/027150, pp. 1-10, with claims searched, pp. 11-15.

(Continued)

*Primary Examiner* — Armando Rodriguez
(74) *Attorney, Agent, or Firm* — O'Banion & Ritchey LLP; John P. O'Banion

(57) ABSTRACT

A tapering enhanced stimulated superradiant amplification method and system which utilizes a strongly tapered undulator in reaching significant power outputs and conversion efficiencies. TESSA dramatically increases conversion/amplification efficiencies by violently (sharply) decelerating electrons and taking advantage of produced radiation to further drive interaction toward as it takes advantage of produced radiation to further drive interaction to increase overall radiation output. The system and method configures a strongly tapered undulator to operate in a new mode that is above normal input saturation levels to provide an amplified output with unexpectedly high efficiencies and power.

24 Claims, 13 Drawing Sheets

Related U.S. Application Data

(60) Provisional application No. 61/982,623, filed on Apr. 22, 2014.

(56) References Cited

U.S. PATENT DOCUMENTS

| | | |
|---|---|---|
| 4,449,219 A | 5/1984 | Smith et al. |
| 4,461,004 A | 7/1984 | Madey |
| 4,479,219 A | 10/1984 | Madey |
| 4,491,948 A | 1/1985 | Deacon et al. |
| 4,740,973 A | 4/1988 | Madey et al. |
| 5,130,994 A | 7/1992 | Madey et al. |
| 6,285,690 B1 | 9/2001 | Kim et al. |
| 6,636,534 B2 | 10/2003 | Madey et al. |
| 6,970,483 B2 | 11/2005 | Minehara et al. |
| 7,321,604 B2 | 1/2008 | Umstadter et al. |
| 2002/0044573 A1 | 4/2002 | Bennett |
| 2003/0179784 A1 | 9/2003 | Minehara et al. |
| 2005/0175042 A1 | 8/2005 | Hajima |
| 2013/0142207 A1 | 6/2013 | Sankar |

OTHER PUBLICATIONS

Bohnet, Justin G. et al., "A steady-state superradiant laser with less than one intracavity photon", Nature, 484, 78-81, Apr. 2012.

Tremaine, A. et al., "Inverse Free Electron Laser Accelerators for Driving Compact Light Sources and Detection Applications", Proceedings of 2011 Particle Accelerator Conference, MOOBN2, New York, NY, USA, 2011.

Bonifacio, R. et al., "The Superradiant Regime of a Free Electron Laser", Nuclear Instruments and Methods in Physics Research A239 (1985) 36-42.

TAPERING ENHANCED STIMULATED SUPERRADIANT AMPLIFICATION

CROSS-REFERENCE TO RELATED APPLICATIONS

This application is a 35 U.S.C. §111(a) continuation of PCT international application number PCT/US2015/027150 filed on Apr. 22, 2015, incorporated herein by reference in its entirety, which claims priority to, and the benefit of, U.S. provisional patent application Ser. No. 61/982,623 filed on Apr. 22, 2014, incorporated herein by reference in its entirety. Priority is claimed to each of the foregoing applications.

The above-referenced PCT international application was published as PCT International Publication No. WO 2015/164531 on Oct. 29, 2015, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDICES

Table 6 referenced herein is a computer program listing in a text file entitled "UC_2015_832_2_LA_US_computer_program_listing_table_6. txt" created on Oct. 19, 2016 and having a 97 kb file size. Table 7 referenced herein is a computer program listing in a text file entitled "UC_2015_832_2_LA_US_computer_program_listing_table_7. txt" created on Oct. 19, 2016 and having a 150 kb file size. The computer program code, which exceeds 300 lines, is submitted as computer program listing appendices through EFS-Web and are incorporated herein by reference in their entireties.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This technical disclosure pertains to generally converting energy from electrical to optical (radiation) beams, and more particularly to tapering enhanced stimulated superradiant amplification. Throughout this document, optical power is intended as electromagnetic field radiation power ranging from THz through to X-ray wavelengths.

2. Background Discussion

Advances are being made toward optical to electrical power conversion using laser accelerators. Among these, the inverse free-electron laser (IFEL) accelerators provide certain advantages due to the lack of nearby boundaries, or medium to couple the light to the electrons. This implies low levels of irreversible losses and in principle enables very high efficiencies.

State of the art EUV plasma light sources are limited to a few hundred watts average power with plans to increase this to 1 kW. The process uses a laser to excite plasma, and a few percent of that energy is converted to EUV radiation which is transported to a semiconductor wafer.

Accordingly, a need exists for techniques which provide significant increases in electrical to optical amplification/conversion.

BRIEF SUMMARY

A "tapering enhanced stimulated superradiant amplification" (TESSA) is described which operates in a new paradigm to achieve order of magnitude increases in electrical to optical (radiation) amplification/conversion efficiencies. The technique makes use of a strongly tapered undulator whose characteristics are selected interoperatively with the level of power in the seed source to provide very high and unexpected efficiencies and power outputs.

It will be noted that a conventional seeded free electron laser system amplifies input seed power in an undulator, until a saturation intensity level is reached, and this saturation level does not depend on the seed level. Thus, introducing seed intensities beyond the saturation level makes no practical sense, as the increased intensity cannot be amplified. However, in the present disclosure a paradigm is described in which an undulator can be configured with strong tapering that interoperates with input intensity levels well beyond normal saturation levels to yield very significant amplification improvements. For example, conventional systems may achieve up to a few percent energy extraction from the electron beam, whereas this new paradigm in the TESSA system allows as much as 50% energy extraction.

TESSA extracts radiation where a high intensity seed beam beyond saturation intensity can be used with selected configurations of strong tapering in an undulator to decelerate the beam and at the same time generate large amounts of radiation. When such seed intensities are not available, TESSA can still be utilized by supplying a pre-bunched electron beam at the entrance. In some ways this mechanism has similarities to what has been described as superradiance, yet with the very strong tapering of the undulator interoperating with an input that is well beyond normal saturation levels, toward attaining significantly larger extraction efficiencies, and qualitatively different, stimulated energy exchange. Therefore, to aid in understanding, the present technology is referred to as tapering enhanced stimulated superradiant amplification or TESSA for short.

While conventional FELs are designed to gradually convert the energy of an electron beam into radiation, TESSA dramatically increases the conversion efficiency by violently (sharply) decelerating electrons. The TESSA undulator field is designed to take advantage of the produced radiation to further drive the interaction, thereby significantly enhancing the interaction strength and overall radiation output. TESSA can produce radiation pulses with peak power which is orders of magnitude larger than what can be obtained from existing FELs at saturation or with conventional tapering. One of the ways this scheme differs from FEL is because the interaction occurs in the deep non-linear regime where the approximations leading to the typical FEL exponential gain are very far from being satisfied. The differences among FEL amplifiers are summarized in Table 1.

By going beyond FEL saturation limits, TESSA takes full advantage of the fact that the FEL interaction occurs in a vacuum, with no close boundaries, and no medium, so that the energy exchange can be designed to be virtually heat-free resulting in very high conversion efficiencies from electrical power to radiation power. However, it will be appreciated that TESSA provides numerous additional benefits, including significantly higher efficiency levels.

The most efficient sources of high power coherent radiation (solid-state or gas lasers) all have less than 30% conversion efficiency. TESSA can easily be readily configured to exceed these limits and has the additional advantage of having a tunable output wavelength, with a spectrum extending to EUV and X-rays. An advantage of high conversion efficiencies from relativistic electron beams is due to the relatively high wall-plug efficiency of the particle accelerators used to generate them. Superconducting radio frequency linear accelerators produce relativistic electron beams with large efficiencies, so an electrical-optical conversion efficiency of above 50% is very attractive.

Additionally, TESSA can be used to create Megawatt (MW) class average power lasers in the visible range of the electromagnetic spectrum, and terahertz beams. By way of example, one application may be directed to energy weapons for use in missile defense systems.

Further aspects of the presented technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The disclosed technology will be more fully understood by reference to the following drawings which are for illustrative purposes only:

DETAILED DESCRIPTION

Figure 1:
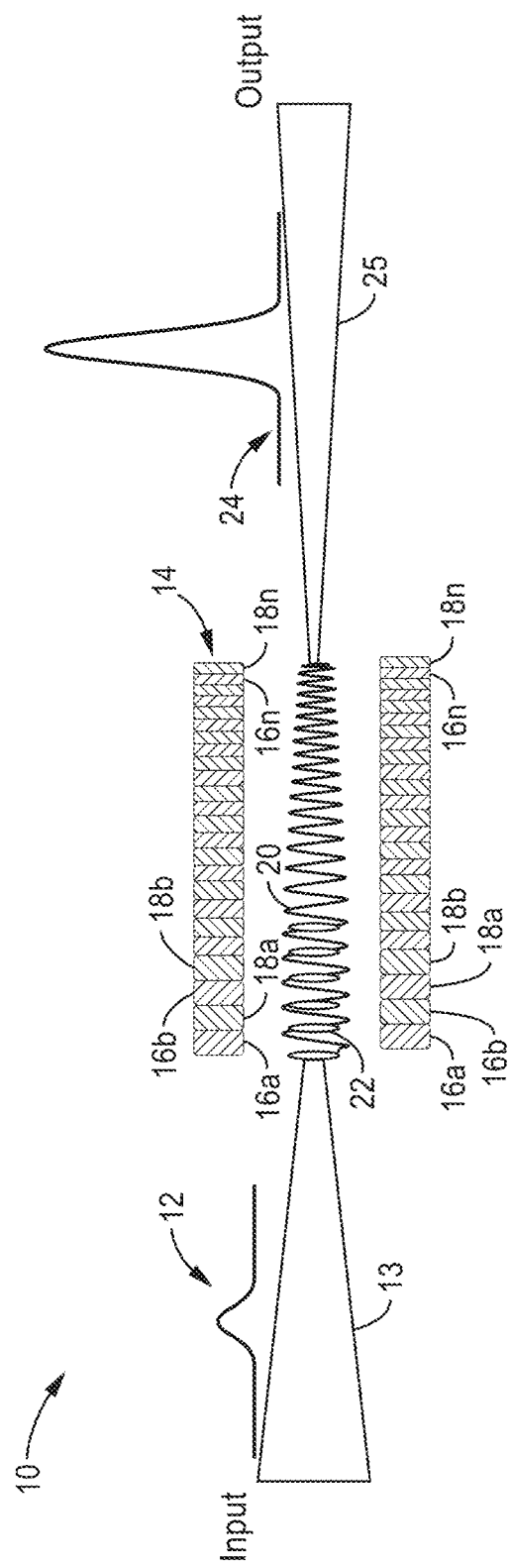
FIG. 1 is a schematic of a tapering enhanced stimulated superradiant amplification (TESSA) system according to an embodiment of the present disclosure.

The ability to generate strong and efficient electron beams, radiation sources, and amplified light pulses is becoming important in a number of application areas. Typical electrical to optical (radiation) conversion of high power coherent radiation sources is limited to the few percent level with best performance lasers (for example $CO_2$) approaching 30 percent. Free-electron lasers (FEL) are based on the interaction of a relativistic electron beam and electromagnetic radiation in a magnetic undulator. These radiation sources are not limited by the loss mechanisms characteristic of atomic lasers, such as solid state and gas phase gain mediums, and carry the unique advantage of wavelength tunability by means of varying the electron energy and the resonant frequency in the magnetic undulator.

On the other hand, the FEL conversion efficiency is usually limited to the Pierce parameter $\rho$, which is typically on the order of $10^{-3}$ or even smaller for short wavelength sources. Undulator tapering, comprising variation of period and/or magnetic field amplitude along the undulator, has been shown to allow increased efficiencies of up to about 1-2% with current studies focusing on the absence of gain guiding and the onset of side-band instabilities.

By contrast, the tapering-enhanced stimulated superradiant amplifier, referred to as TESSA, is capable of boosting conversion efficiency by over 50%, which represents an improvement of more than one order of magnitude over existing FEL paradigms, while being capable of generating significantly increased power output levels. The TESSA mechanism is based on the use of a high energy relativistic pre-bunched electron beam in combination with a strongly tapered undulator configured for operating with an intense seed radiation pulse. In at least one embodiment, the undulator can be configured to use a pre-bunched electron beam when a high intensity seed input is not available. It should be appreciated that the present disclosure may be utilized with different forms of undulators, such as comprising helical undulators, planar undulators, and other available geometries.

When an electron beam is injected into a strongly tapered helical undulator with an intense seed radiation pulse which is above the saturation, it is possible with TESSA to take advantage of the stimulated emission driven energy exchange to violently decelerate the electrons and extract most of their energy converting it into radiation, only if the elements of the strongly tapered undulator are configured to take advantage of this above saturation input scenario.

1. Important Features of TESSA

Important elements in the TESSA paradigm comprise: (a) a strongly tapered undulator (e.g., helical undulator) with tapering of preferably both the period and the magnetic field amplitude; (b) an intense radiation pulse with intensity larger than typical FEL saturation intensities. This pulse can be obtained from a low rep-rate seed laser, from the build-up in an oscillator configuration or from refocusing the conventional FEL radiation output; (c) an aggressive undulator tapering configuration scheme allowing it to interoperate with the high energy levels and maximizing extraction efficiency to find the best compromise between deceleration and detrapping. These features are described in detail below, while coding examples of configuring the strongly tapered undulator for use with the specific above saturation seed input are found in Table 6 with updated coding in Table 7. The features of this strong tapering utilized with the helical undulator maximize the electron accelerating gradient and therefore maximize radiation power production. Maximum conversion and output power are obtained for TESSA when injecting the input electron beam pre-bunched, and at higher energy than "optimal" (and above conventional saturation levels) for a conventional FEL amplifier (as much as twice the optimal), and extracting e-beam at "optimal" energy.

(a) Strongly Tapered Helical Undulator

A planar undulator is a device used to create a magnetic field with harmonically varying amplitude along the axis and direction perpendicular to the axis of propagation. A helical undulator may be constructed as the superposition of two of these planar undulators situated perpendicularly to each other and with a phase lag of 90° between each other. The resulting magnetic field vector measured along the axis of the undulator traces out a spiral in a plane perpendicular to the axis and induces a helical motion in the electron beam as it propagates along the undulator field.

An important part of the TESSA method/apparatus is the use of strong tapering of the undulator which is configured to operate in combination with the very high input power levels. In order to maintain FEL resonant condition, while accounting for changes in the energy of the electron beam as it propagates along the undulator, the undulator parameters (undulator period and field strength) must be changed. Since these parameters generally either get smaller or greater along the axis of the undulator, it is said that the parameters are tapered along the undulator. Strong tapering means that the parameters are changed quickly period-by-period, in response to a rapidly decelerating electron beam. As the electron beam passing through the undulator loses energy, it radiates electromagnetic radiation. This radiation adds coherently to the radiation driving the interaction, and the constant amplification of the radiation further drives the interaction, and compensates diffraction losses providing a gain guiding.

The accelerating gradient that an electron beam experiences when resonantly copropagating with radiation in an undulator is approximately twice in a helical undulator than that of a planar undulator. The more energy the electron beam loses, the more energy the laser beam gains.

The resonant energy is defined as the energy for which the ponderomotive phase θ is stationary (dθ/dz):

$$\theta' = k_w - k\frac{1+K^2}{2\gamma^2} = 0 \Rightarrow \gamma_x = \sqrt{\frac{k}{2k_w}(1+K^2)}$$

The tapering is calculated by matching the ponderomotive accelerating gradient available (proportional to the laser field) to the derivative of the resonant energy:

$$\left(\frac{d\gamma_r}{d_z}\right)_{ponderomotive} == \frac{kK_1 K}{\gamma_r}\mathrm{Sin}[\theta_r]$$

-continued $$\left(\frac{d\gamma_r}{d_z}\right)_{tapering} = \left(\frac{d\gamma_r}{d_z}\right)_{ponderomotive}$$

$$\frac{d}{d_z}\sqrt{\frac{k}{2k_w}(1+K^2)} = \frac{kK_1 K}{\gamma_r}\mathrm{Sin}[\theta_r]$$

The undulator period may be set to be constant, in which case the equation for the normalized undulator field strength K is:

$$\frac{dK}{dz} = 2k_w K_1 \mathrm{Sin}[\theta_r]$$

If an undulator builder equation is utilized to express the normalized undulator builder equation K in terms of undulator period $\lambda_W$, then the undulator period can be solved for with:

$$\lambda'_w = -\frac{8\pi K_1 K \mathrm{Sin}[\theta_r]}{\left(1+K^2+\lambda_w 2K\frac{\delta K}{\delta\lambda_w}\right)}.$$

It will be appreciated that $\lambda_W$, $k_W$ represent undulator wavelength wherein $k_W=2\pi/\lambda_W$. Laser wavelength is represented by $\lambda$, k in which $k=2\pi/\lambda$. The normalized undulator vector potential K is defined as $K=eB/m_0 ck_W$. The normalized laser vector potential $K_1$ is defined as $K_1=eE_0/m_0 c^2 k$. Value B is the on-axis magnetic field, in which B=1.8 $B_r e^{-\pi g(z)/\lambda_W}(1-e^{-2\pi L/\lambda_W})$. It will be noted that one can move the beam off-axis to vary B. Undulator gap is represented by g. The permanent magnet residual field strength $B_r$=1.22T for NdFeB material, and 1.7T for praseodymium. Resonant energy $\gamma_r$ is given by $$\gamma_r = \sqrt{\frac{\lambda_w}{2\lambda}(1+K^2)}.$$

Resonant phase is represented by $\theta_r$ or $\Psi_r$. Particle relativistic factor γ is given by $\gamma=(1-\vec{v}^2/c^2)^{-1/2}$. The energy equation of motion $$\frac{d\gamma}{d_z}$$

whereby $$\frac{d\gamma}{d_z} = \frac{kK_1 K}{\gamma}\mathrm{Sin}[\Psi].$$

Phase equation of motion is $$\frac{d\Psi}{d_z}$$

with $$\frac{d\Psi}{d_z} = k_w - k\frac{1+K^2}{2\gamma^2}.$$

While an inverse free electron laser (IFEL) increases the energy of electrons by transferring energy from a laser to the electrons, TESSA uses the converse principle to reduce the energies of the electrons, transferring energy from the electrons to add to the laser energy. In a very general sense TESSA is sort of a reverse IFEL, and aspects of its feasibility are experimentally supported by the demonstrated IFEL performance.

(b) Refocusing FEL Radiation at Saturation

An FEL is a laser which uses an electron beam propagating in an undulator to create coherent radiation (a laser). This radiation diffracts as it propagates. Diffraction means that the power spreads out over a larger area, reducing intensity and therefore field strength which drives the TESSA interactions. If transverse spot size of the radiation is then reduced with a focusing element (e.g., lens or mirror with focusing curvature), the power of the radiation can be focused or concentrated. The concentrated radiation (i.e., higher intensity) creates a larger field which allows very large decelerating gradients in TESSA. Larger decelerating gradients mean larger amount of energy produced in a given amount of time, or larger power, insofar as the undulator is configured to interoperate with these large intensities. At wavelengths where high intensity seed sources are not available, and yet high quality optics are available (i.e., EUV at 13.5 nm), an embodiment may refocus FEL light to power TESSA.

(c) Tapering Configuration Process

The tapering of the undulator has a number of important features and benefits. The tapered undulator allows maximal extraction of energy for a given seed laser. The large seed allows us to start tapering aggressively in TESSA. When the undulator is tapered assuming only the seed laser, a certain amount of energy can be transferred from the electrons to radiation. If we use the tapering which is configured for the seed laser only, the radiation power output scales linearly with the electron beam current, that is to say that if you double the electron beam current, you would double the radiation produced by the interaction. This is considered the low gain regime for TESSA.

However, for large electron beam currents this produced radiation adds coherently with the seed laser, dramatically increasing the radiation available for driving the interaction. It is important to realize that this additional radiation must be factored in when configuring the parameters for the tapered undulator. Accordingly, the radiation power output increases non-linearly with the current input, and more particularly it increases faster than linear.

Various techniques may be utilized according to the disclosure for determining undulator tapering to maximize produced power. The inventors developed a routine referred to as Genesis influenced tapering scheme (GITS) to configure this strong tapering toward improving conversion efficiency by estimating the radiation available for decelerating the electron beam along the undulator. GITS operates utilizing 3D simulation code Genesis 1.3 (or simply Genesis) to solve the equations of motion for the electrons and Maxwell's field equations to determine the laser fields produced by the interaction. The laser field intensity is obtained from Genesis' radiation distribution, and the change in the undulator parameters is then determined for the next period using this information. In this way, the electron decelerating gradient set by the undulator tapering is maximized for the estimated radiation at that point in the interaction.

Sample code for GITS is presented in Table 6, with updated coding in Table 7. The code uses the derivative of the undulator builder equation for a helical Halbach undulator:

$$B = 1.8 B_r e^{-\pi g(z)/\lambda_w W}(1 - e^{-2\pi L/\lambda_w W}).$$

along with the equation for the change in the undulator period:

$$\lambda'_w = -\frac{8\pi K_1 K \mathrm{Sin}[\theta_r]}{\left(1 + K^2 + \lambda_w 2K \frac{\delta K}{\delta \lambda_w}\right)}$$

to solve for the tapering period by period as the Genesis simulation determines the on-axis intensity. Functions for fixed period tapering have also been coded.

Currently, the code samples radiation field strength seen by each electron in order to find the minimum field seen by most electrons in order to keep them resonant. Options for minimum, mean, medium, and maximum intensity seen by the electrons are available for use in the tapering equations. Another possibility is to use the Genesis determined phase space coordinates for each particle to calculate the trajectories of each particle during each undulator period simulation and use that information to estimate the radiation seen by each electron during each period. Furthermore, the electron beam focusing may be varied within the undulator during its configuration. Scans over various input parameter values allow selecting these for optimum results for different output parameters. Further ideas for improvement are noted in the comments of the code.

2. TESSA Configurations

FIG. 1 illustrates an example embodiment 10 of TESSA. A strong seed pulse 12 and relativistic beam 13 are directed at a strongly tapered undulator 14 to stimulate emission of a large amount of radiation from pre-bunched superradiant electron beams. The undulator 14 is seen with a first set of opposing magnets 16a, 16b, through 16n, with an interspersed second set 18a, 18b through 18n of an opposing polarity. It will be seen that the magnet sizing and strength tapers significantly from the input to the output of undulator 14. The pre-bunched superradiant electron beams 22 are seen along with beam 20, moving through the undulator to provide output pulse 24, and decelerated e-beam 25. This emission of radiation causes the electrons to quickly lose their energy. If the undulator is tapered in order to maintain the resonant condition and sustain a strong coupling to the fundamental laser mode, one can achieve very high conversion efficiencies.

The structure of TESSA may be thought of as a form of reversal of an inverse free-electron laser (IFEL) accelerator. The IFEL accelerators as well as TESSA provide some unique advantages due to the lack of nearby boundaries, structure or medium to couple the light to the electrons, and results in a direct coupling between electromagnetic field and relativistic electron beam with very little irreversible losses enabling in principle very high conversion efficiencies.

Coupling the high conversion efficiencies made possible by TESSA with the relatively high wall-plug efficiency in creating relativistic electron beams, using for example, superconducting radio frequency-based accelerators, opens the way to providing high-average power radiation sources.

Considering the spectral tunability of the interaction, applications for this new high-conversion efficiency mechanism are numerous, the following being provided by way of example and not limitation. (a) TESSA can be used at THz wavelengths, utilizing a waveguide to avoid slippage problems, to generate mJ THz pulses at a very high repetition rate (MHz), and can easily provide the highest peak and average power radiation source in this frequency range. (b) In the visible and UV spectral range, TESSA can be operated in conjunction with very high average power electron beams to generate multi-kW average power lasers, which could be employed for laser-inertial fusion or as speed-of-light weapons. (c) In the EUV spectral range, TESSA might find its best or first application. Extreme ultraviolet lithography (EUV) requires multi-kW radiation sources to speed up manufacturing of ultra-small electronic circuits to supply increasing demands of the global market. (d) In the X-ray spectral range (optical pulse output is a photon pulse), TESSA can be utilized to boost the peak power of X-ray FELs to multiple Terawatts (TW) toward enabling single-shot coherent diffractive imaging of proteins, virus and biological samples.

Two different regimes of operation are described for TESSA.

(a) Low gain regime. In the small gain regime, the electromagnetic radiation can be considered nearly constant. In this case the amplifier behaves as a particle decelerator with an output that is only a few times (less than 5) larger than the input signal. This regime can be useful in an oscillator configuration where a small fraction of the output power is split and redirected at the input.

Figure 2:
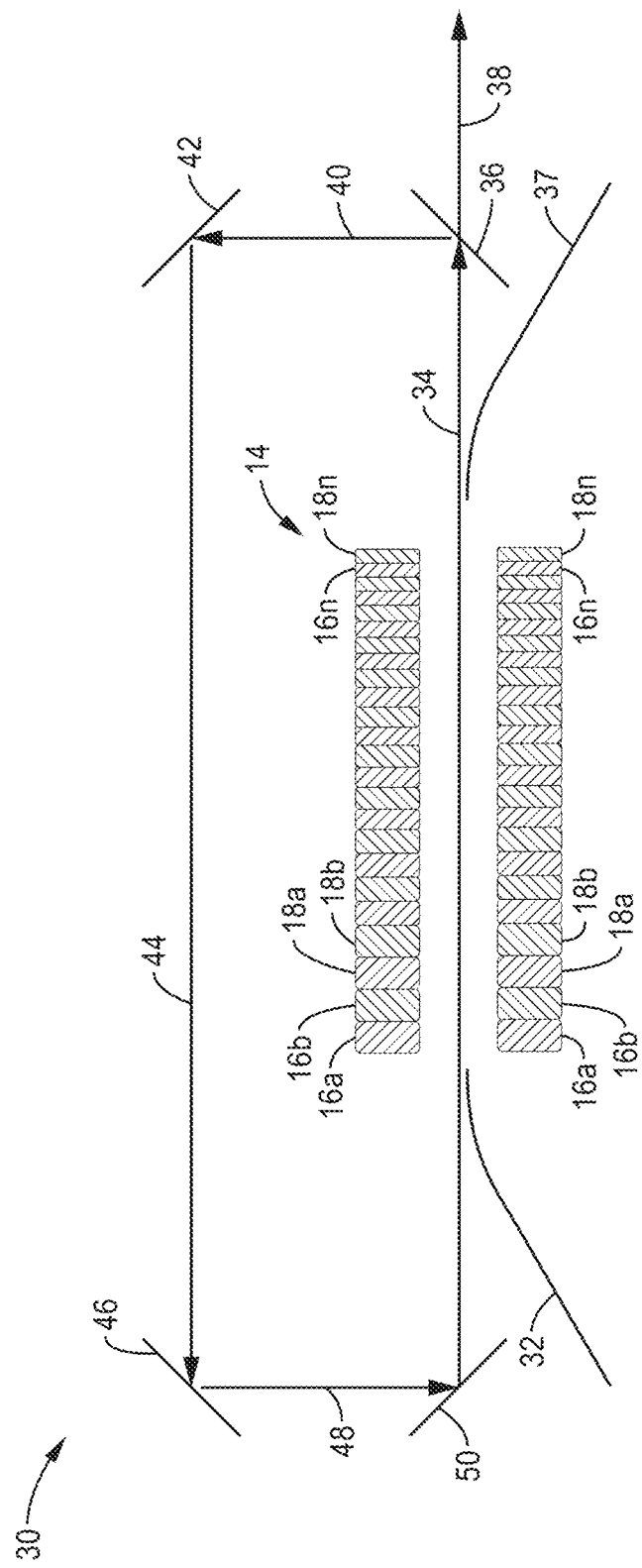
FIG. 2 is a schematic of using TESSA in a low gain regime, such as with an oscillator configuration, according to an embodiment of the present disclosure.

FIG. 2 illustrates an example embodiment 30 of TESSA in the low gain regime (or oscillator configuration) with a portion of the output fed back to the input. An undulator 14 is seen with a plurality of first and second magnetic polarities 16a, 16b, . . . 16n, and 18a, 18b, . . . 18n, which are strongly tapered along the undulator length. A high repetition rate (rep-rate) e-beam 32 is seen input at undulator 14 with undulator output 34 striking a partial mirror 36 so that a first part of the signal is output 38, and a second part reflected along path 40, to a mirror 42 into path 44 which strikes mirror 46 to deflect signal on path 48 to strike mirror 50 and direct the signal back into undulator 14. Output radiation 37 is also seen in the figure. The above feedback structure is provided by way of example and not limitation, as one of ordinary skill in the art will appreciate that numerous other arrangements may be utilized insofar as a portion of undulator output is fed back to the undulator input.

For the low gain regime, the conversion efficiency here can be estimated easily for a constant period undulator to be $\eta = 2\pi N_u K_1 \sin \Psi_r$, in which $N_u$ is the number of undulator periods, $K_1$ is the seed normalized vector potential and $\Psi_r$ is the design resonant phase, such as around 45° as an optimum compromise between larger deceleration closer to 90° and maximum trapping closer to zero.

More efficient tapering options involve varying the undulator period which also has many advantages, including a stronger coupling (one can keep K larger along the interaction) and in the practical implementation of the magnetic undulator, since usually the magnetic field depends on the undulator period and using the presented technology one can keep the gap sufficiently large to allow clearance for both radiation and electron beams.

If one includes diffraction effects in the strong taper undulator configuration for the low gain regime, it is found that the input seed should be focused at the center of the undulator with a Rayleigh range about ⅙ of the undulator length. For large $K_1$ and a long undulator this number can easily approach 50%.

The input electron beam does not need to be pre-bunched as one can design the entrance section of the undulator to pre-bunch the e-beam before the actual deceleration and energy extraction takes place. If the output coupler introduces too much loss in the cavity, it is always possible to shorten the build-up time of the oscillator using a low repetition rate igniter pulse to be injected from the left of the cavity.

It should be appreciated that the same configuration described above for the low gain regime may be generally applied in a high gain regime, (i.e., regenerative TESSA amplifier), insofar as 'start-up' transient regime issues are resolved.

(b) High gain regime. In the low gain regime, conversion efficiency is independent of the beam current, due to the fact that the radiation increasing along the undulator is not being considered when configuring the undulator. When one includes this effect, a steeper tapering can be allowed and strong amplification can occur in this new operating range/regime.

The present disclosure provides methods and embodied routines for determining tapering parameters within this operating range/regime to take advantage of the newly generated radiation intensity in the most efficient way. These routines in the form of an undulator configuration scheme were developed by taking advantage of three-dimensional (3D) computer simulations. The Genesis-Informed Tapering (GITS) process was developed to read-off the on-axis intensity after solving field propagation equations for a small section of the undulator and use this information to configure the next period undulator parameter variations toward maximizing energy extraction without compromising the trapping. An example implementation of this GITS routine coded in C++ is included in Table 6, with updated coding in Table 7.

The results of using GITS to create an undulator to work in this operating area are impressive. In one example, using a 13 nm EUV source a 10 GW input signal was used with a 1 GeV beam being decelerated by nearly 50%, generating EUV power in the order of 1.5 TW.

Figure 3:
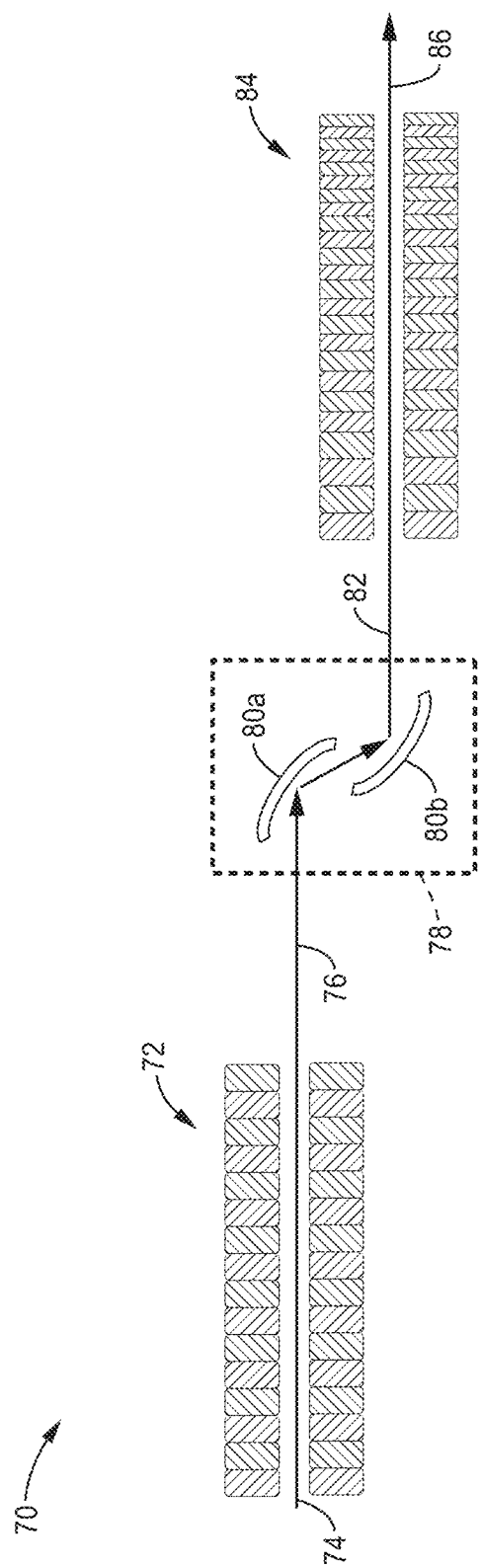
FIG. 3 is a schematic of using TESSA in a high gain regime according to an embodiment of the present disclosure, and exemplified as using a TESSA afterburner following an FEL undulator whose output is refocused prior to reaching TESSA.

FIG. 3 illustrates an example embodiment 70 of TESSA in the high gain regime, where it may be utilized as an afterburner for a high gain FEL amplifier. A non-tapered undulator 72 for the standard FEL amplification is seen with input beam 74 and output 76 received by refocusing optics 78, depicted as a pair of mirrors 80a, 80b, from which a refocused beam 82 is directed to a TESSA afterburner 84, generating output beam 86.

The curved mirrors refocus radiation into the TESSA undulator, and thus allow increasing intensity for a given pulse power and initiation of the high gain TESSA mechanism.

The extension of this scheme at lower wavelengths requires taking into account the effects of energy spread and beam emittance. The TESSA system is a strongly driven system. The main effect of energy spread and emittance in the interaction are at the entrance of the amplifier where they contribute to an effective broadening of the resonance so that particles with larger angles, or large energy deviation from the resonant energy, will not be captured and decelerated in the TESSA potential. In order to avoid this, a high quality electron beam must be utilized. The other effect related to the transverse beam quality is due to the spot size of the beam and the overlap between electron and laser signals. Ideally, the electron beam should be many times smaller than the radiation size. When the size of the beam approaches half of the radiation size, the field felt by the outside beam particles will be half of the field at the center causing them to get detrapped. One embodiment for mitigating this problem focuses the electron beam near the waist of the seed laser. The GITS tapering configuration process may be configured to sample the fields seen by each simulated particle and estimate the maximum intensity to be used in determining the tapering configuration while maintaining resonance for a desired fraction of simulated particles (e.g., greater than 99%).

Figure 4:
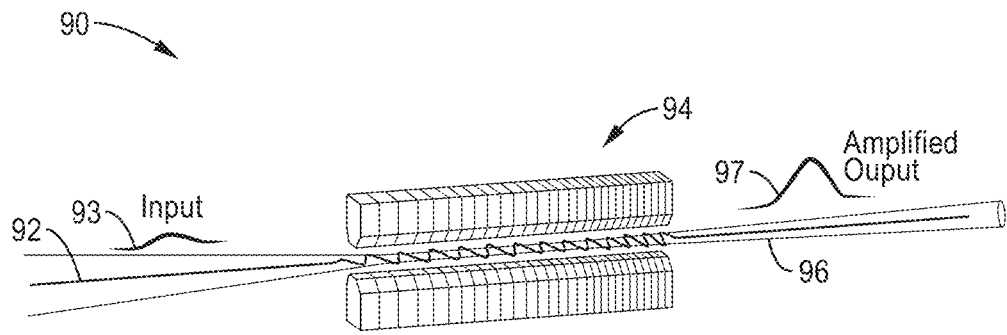
FIG. 4 is a pictorial representation of TESSA generating an amplified output pulse in a decelerated e-beam according to an embodiment of the present disclosure.

FIG. 4 illustrates another view of a TESSA embodiment 90 showing the strongly tapered undulator 94 with an e-beam 92, which is optionally pre-bunched, and input seed laser 93 which TESSA amplifies to a decelerated e-beam output 96 and optical output pulse 97. TESSA takes advantage of using a strong, beyond saturation, input field (stimulus) to enhance radiation emission and efficiency in the energy exchange of a relativistic beam and a radiation pulse in a magnetic undulator. The use of this beyond saturation input interoperating with the GITS determination of undulator configuration can provide amplification well beyond what was previously considered in the art, with amplification possible by a factor of up to more than one order of magnitude, and not merely a small percentage as in the prior art uses of an undulator. It uses for the first time a very high initial intensity to enable high capture, high gradient deceleration and high efficiency radiation emission.

It will be noted that the strong input field can be obtained by using refocusing optics from an external seed laser, a saturated FEL amplifier, or using a pre-bunched electron beam. Still further, TESSA can be operated in high gain (single pass) or low gain (oscillator) regimes.

Figure 5A:
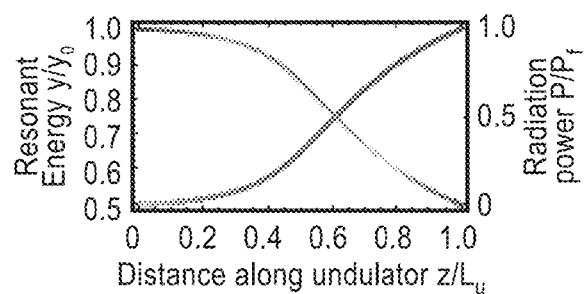
FIG. 5A and FIG. 5B are plots of energy characteristics of TESSA for an implementation according to an embodiment of the present disclosure.
Figure 5B:
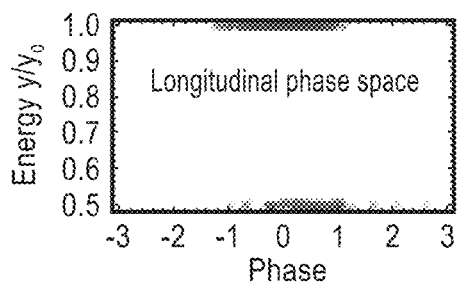

FIG. 5A and FIG. 5B depict aspects of the TESSA system, showing resonant energy curves in FIG. 5A, and energy with respect to phase in FIG. 5B. In FIG. 5A, it can be seen that TESSA does not violate energy conservation. The radiation power increases at the same rate that the electron beam energy decreases. In FIG. 5B, the electron beam distribution at the output of the TESSA amplifier is shown. In this figure, one can see that not all of the particles are decelerated. A properly configured TESSA undulator maximizes the number of particles decelerated.

The determination of the taper required to interoperate with the over-saturation levels of input is determined according to the disclosure. For low electron beam current, this configuration does not compensate for radiation emission in the small gain regime. Given an externally pre-set radiation profile, it is based on an analytic solution for constant period, varying magnetic field amplitude (gap, weaker permanent magnets, and so forth). Yet, varying periods increase flexibility which may be technically simpler because peak field amplitude has strong dependence on $\lambda_W$.

3. Undulator Configuration with GITS

Figure 6:
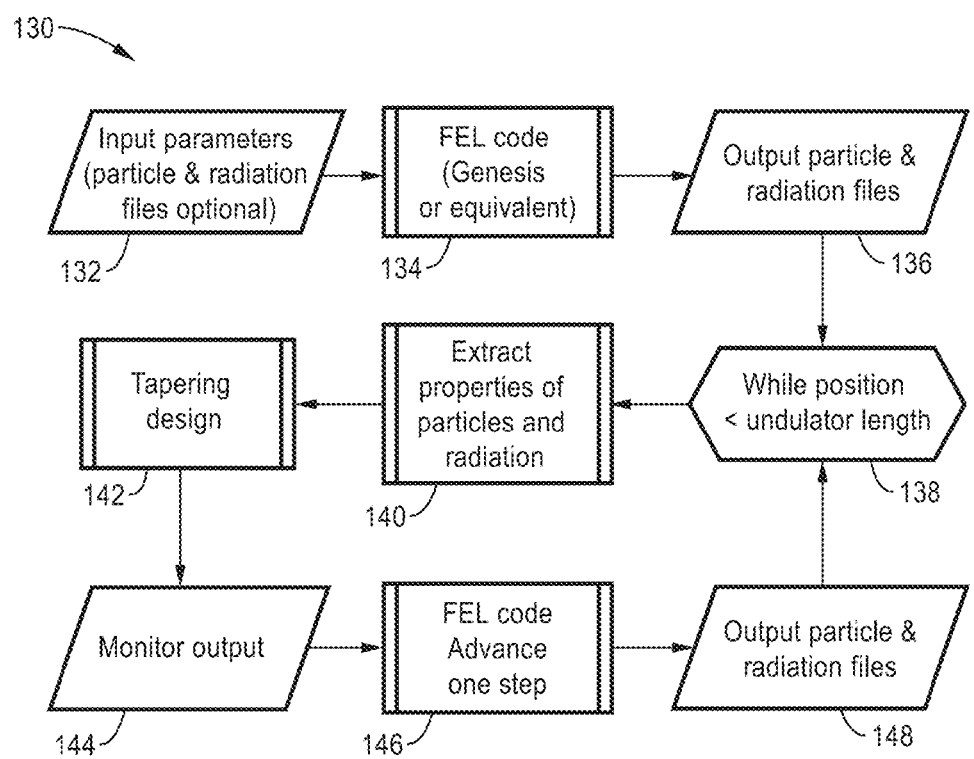
FIG. 6 is a flow diagram of a method for configuring a strongly tapered undulator along its length to interoperate with an oversaturated seed beam according to an embodiment of the present disclosure.

FIG. 6 illustrates an embodiment 130 of the genesis influenced tapering scheme (GITS) determining configurations of the strongly tapered undulator for TESSA. Parameters are input 132 with particle and radiation files optionally loaded. An FEL code 134 solves the Maxwell and Lorentz force equations determining the evolution of the electron beam distribution and the radiation in an undulator, with particle and radiation files being output 136. A loop commences in block 138 to execute so long as the position is less than undulator length. In this loop, properties of the particles and radiation are extracted 140, with tapering design 142, with output monitored 144, then FEL code is advanced one step 146, with particle and radiation files output 148 before returning to decision block 138 at the top of the loop.

4. Undulator Configuration Examples from GITS

Figure 7A:
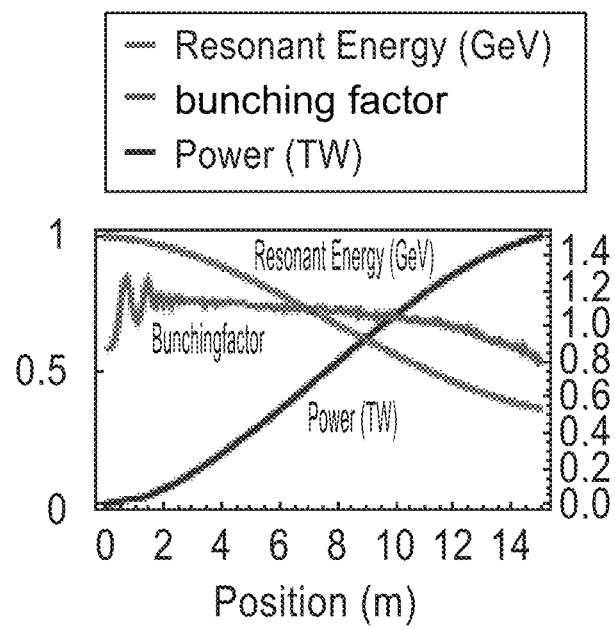
FIG. 7A and FIG. 7B are plots of TESSA efficiency and ideal tapering utilized according to an embodiment of the present disclosure.
Figure 7B:
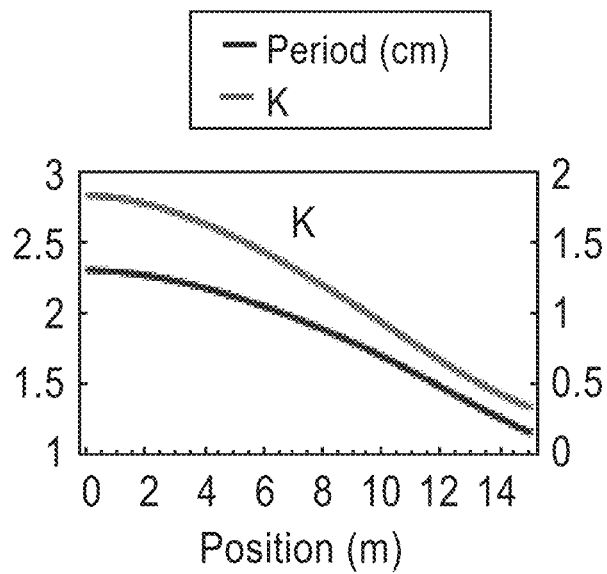

FIG. 7A and FIG. 7B depict plots of TESSA efficiency and ideal tapering as determined by GITS. Resonant energy (GeV) is seen in FIG. 7A by the plot starting from the upper left corner and ending at approximately 0.5, showing final e-beam energy that is 50% of initial energy. Bunching factor is seen in the center plot. Power is seen in the plot starting from lower left corner and extending to the upper right corner. Initial beam power is 1 GeV×3 kA=3 TW, with final radiation power 1.5 TW in this 50% efficiency TESSA example. In FIG. 7B the ideal tapering parameters of period are seen in the lower curve, and value for K in the upper curve, both being plotted with respect to position along the strongly tapered undulator. The parameters for this TESSA implementation are listed in Table 2.

Figure 8A:
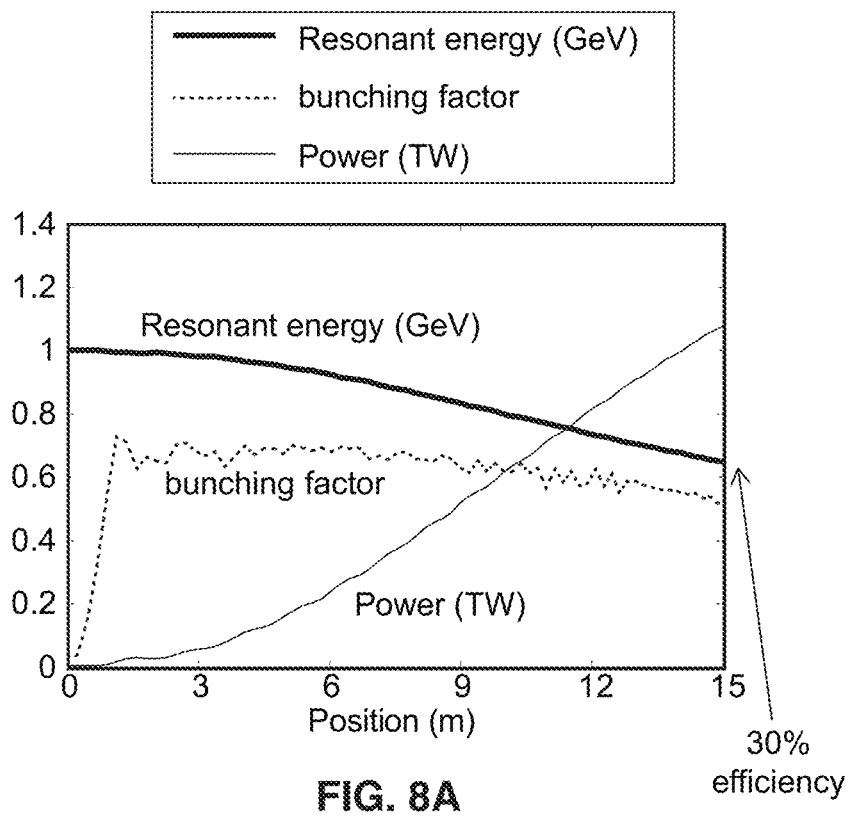
FIG. 8A and FIG. 8B are plots of undulator efficiency and tapering without utilizing the pre-bunched beam according to an embodiment utilizing elements of the present disclosure.
Figure 8B:
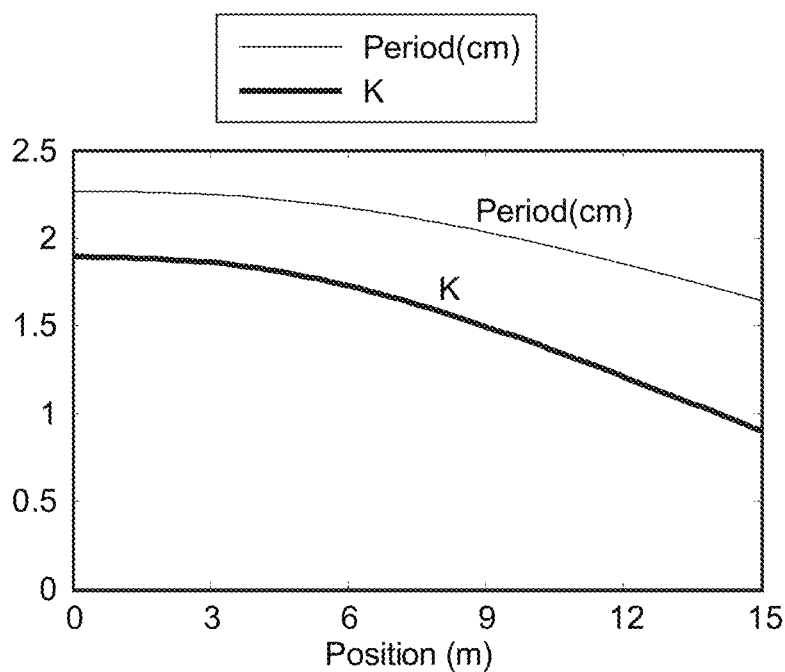

FIG. 8A and FIG. 8B depict the operation of the undulator in the same configuration as above, but without the use of the pre-bunched beam. It can be seen in FIG. 8A that the resultant efficiency is 30%, with different configuration of period and K along the undulator shown in FIG. 8B. This is still significantly larger than a standard FEL due to the input intensity being larger than the FEL saturation intensity.

Figure 9A:
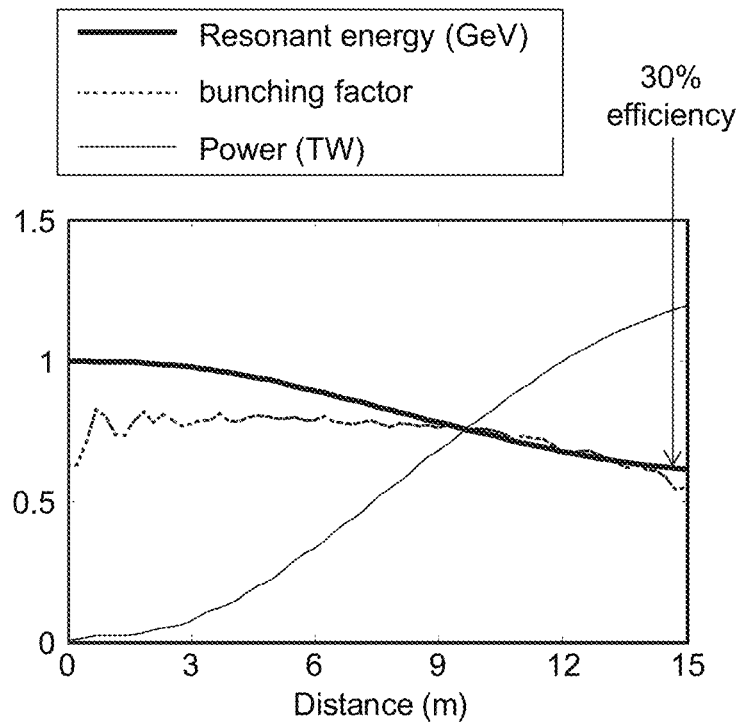
FIG. 9A and FIG. 9B are plots of undulator efficiency and tapering in an undulator configuration with constant period and only amplitude tapering according to an embodiment utilizing elements of the present disclosure.
Figure 9B:
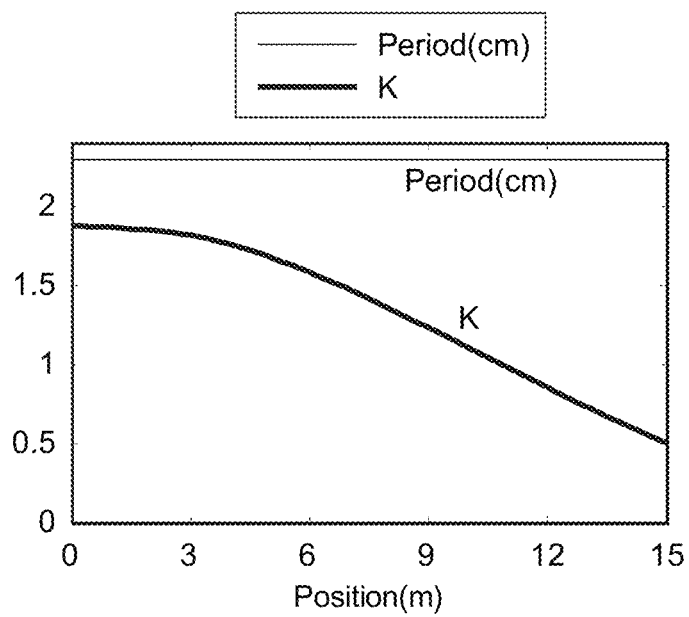

FIG. 9A and FIG. 9B depict the operation of the undulator in the same configuration as in FIG. 7A, but shown with a constant period and only amplitude tapering. It can be seen in FIG. 9A that the resultant efficiency is 30%, with period being fixed, and K selected along the undulator as seen in FIG. 9B. Therefore it can be seen that TESSA will also provide very large conversion efficiencies even if period tapering is not implemented.

Additional examples of TESSA configurations are described below for different radiation wavelengths.

Table 3 outlines an undulator Configuration for 3 Å output radiation. The table lists energy, current, emittance, and spot size for the e-beam, as well as laser power, and period, K, and length for the undulator.

Figure 10A:
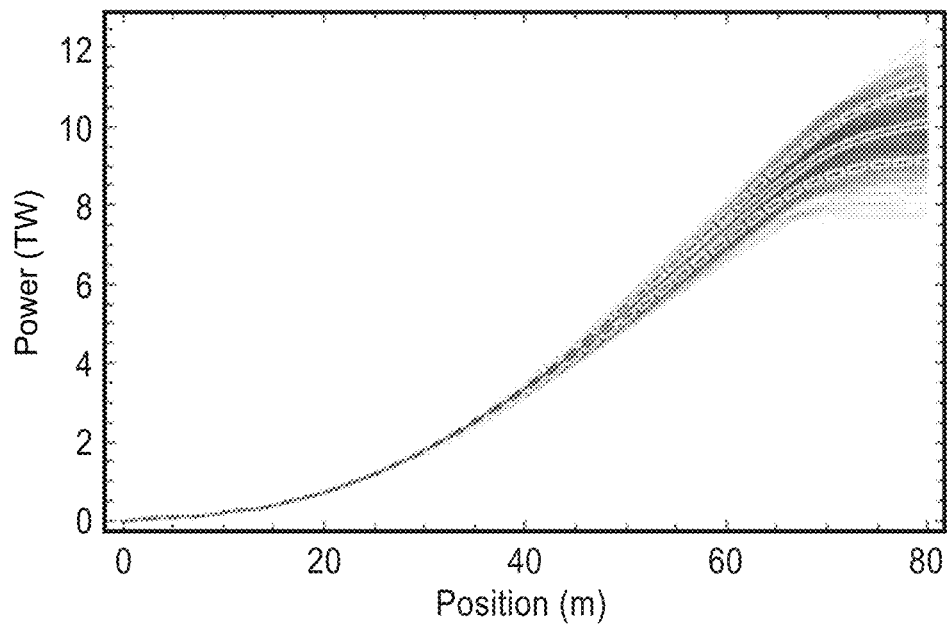
FIG. 10A through FIG. 10D are plots of GITS simulations for 3 Angstrom (Å) radiation according to an embodiment of the present disclosure.
Figure 10B:
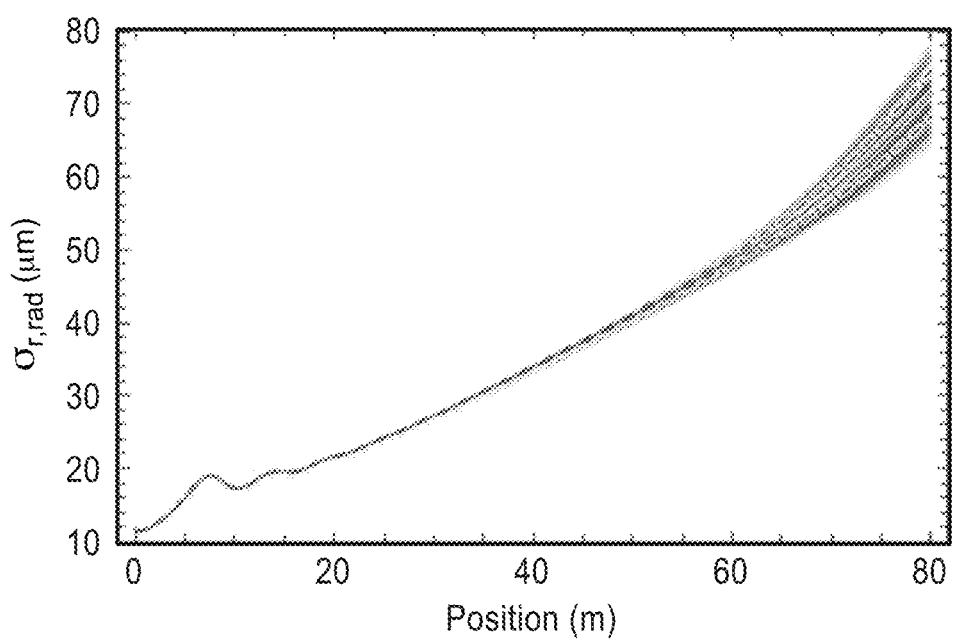
Figure 10C:
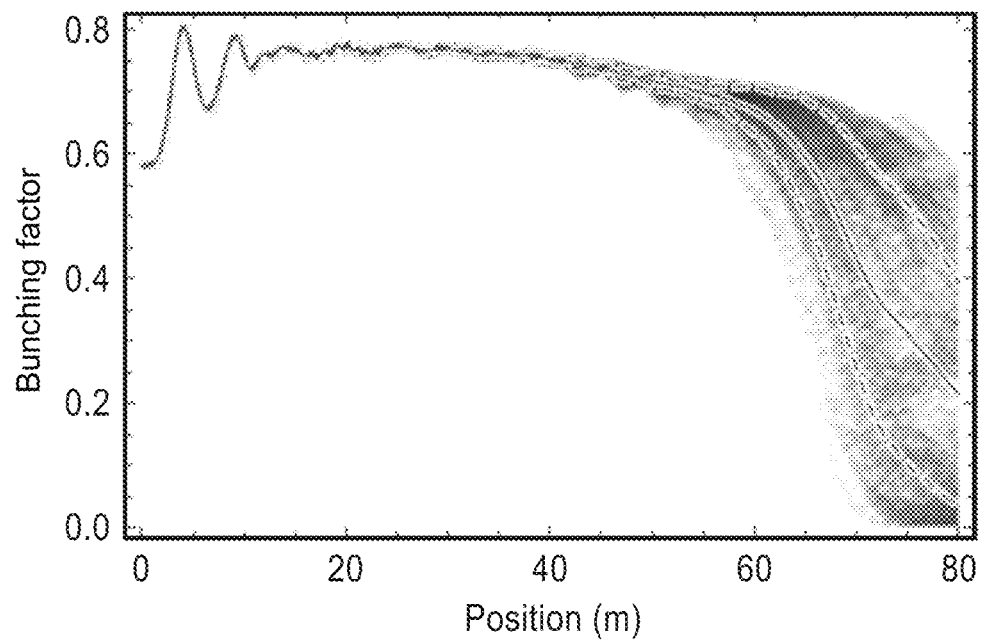
Figure 10D:
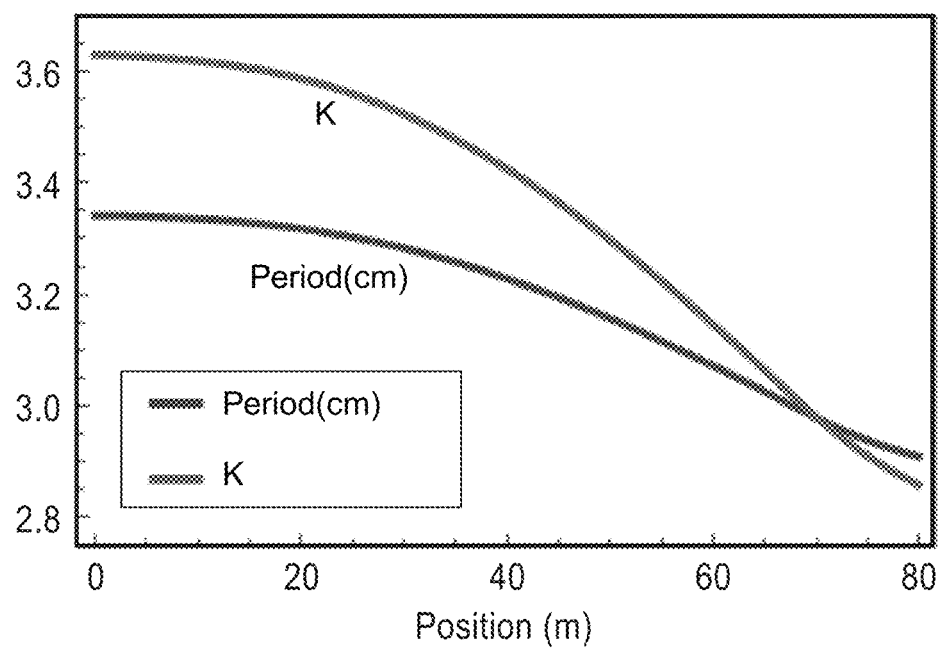

FIG. 10A through FIG. 10D depict simulation examples for the above undulator configuration, showing undulator power (FIG. 10A), radiation power along the undulator (FIG. 10B), bunching factor (FIG. 10C), and variation of undulator parameters (FIG. 10D).

Table 4 outlines an undulator configuration for 10 μm output radiation.

Figure 11A:
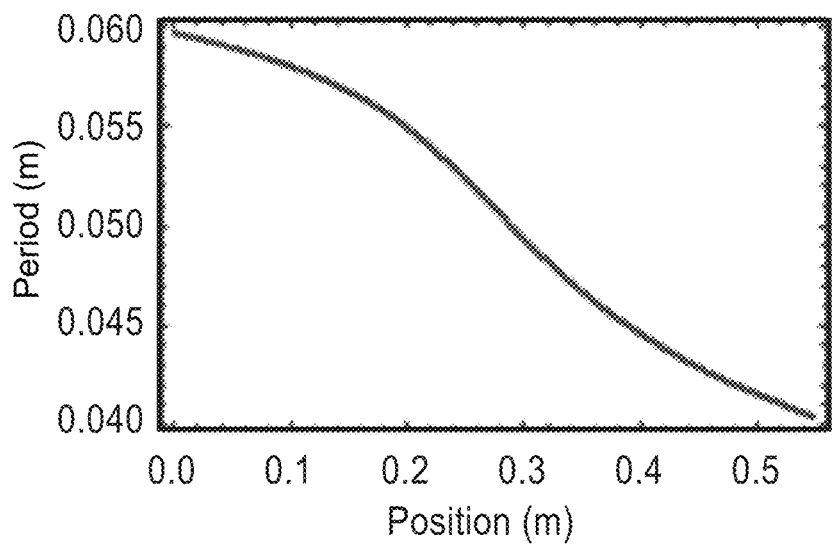
FIG. 11A through FIG. 11C are plots of GITS simulations for 10 μm radiation according to an embodiment of the present disclosure.
Figure 11B:
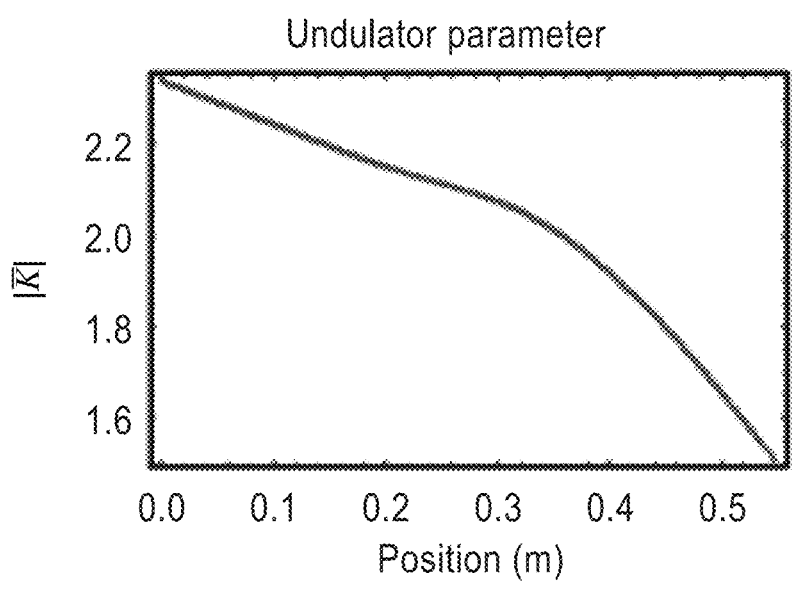
Figure 11C:
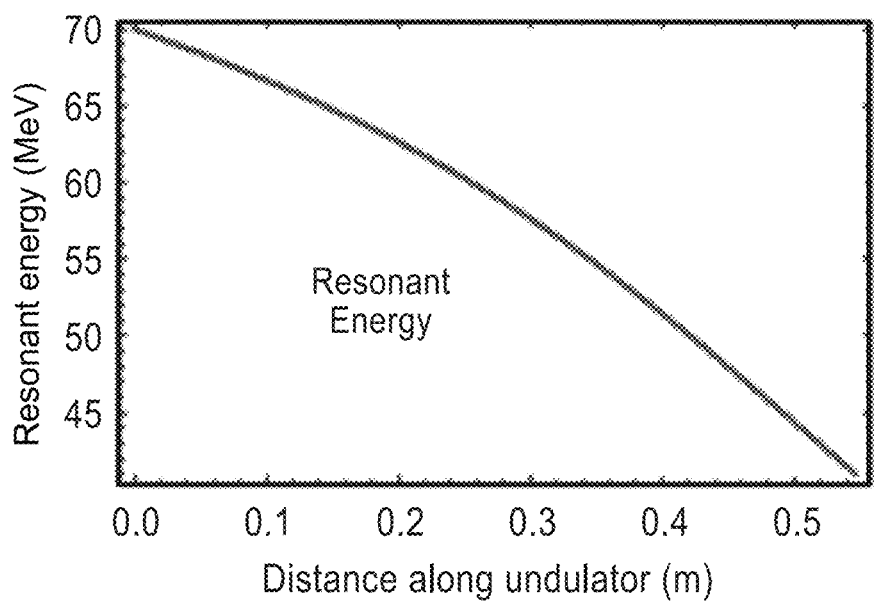

FIG. 11A through FIG. 11C depict simulation examples for the above 10 μm undulator configuration, showing period configuration along the length of the undulator (FIG. 11A), variation of normalized magnetic field amplitude (FIG. 11B), and variation of resonant energy (FIG. 11C).

Table 5 outlines an undulator configuration for 266 nm output radiation.

Figure 12A:
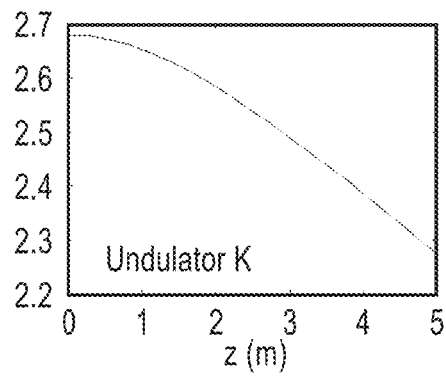
FIG. 12A through FIG. 12D are plots of GITS simulations for 266 nm radiation according to an embodiment of the present disclosure.
Figure 12B:
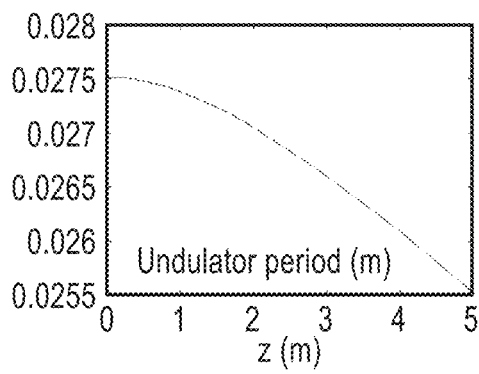
Figure 12C:
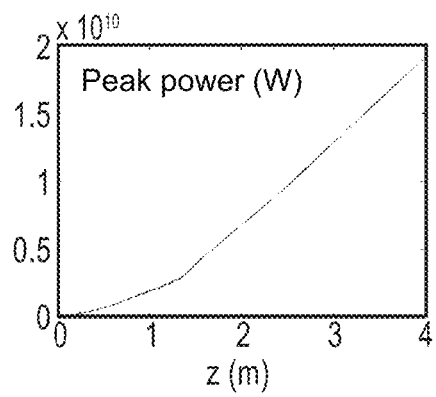
Figure 12D:
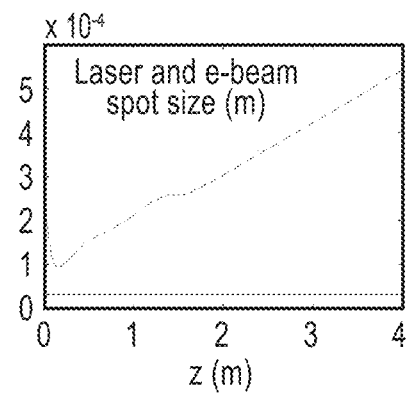

FIG. 12A through FIG. 12D depict simulation examples for the above undulator configuration, showing variation in undulator K parameter (FIG. 12A), configuration of undulator period along an undulator length of 5 m (FIG. 12B), peak power increase with respect to length (FIG. 12C), and radiation spot size (FIG. 12D).

5. Comparing TESSA to Prior Approaches

The relationship of the electron beam resonant energy, $\gamma_r$, and a fundamental FEL wavelength $\lambda_r$ is uniquely defined (as presented earlier in the resonant energy equation), and for each undulating cycle it is determined by the physical length of the undulator period $\lambda_W$ and a period normalized strength, K. Most operating FEL undulators are non-tapered (period and strengths stay the same throughout the entire length of the device). In this case the maximum energy loss by the electron beam before it falls out of resonance is defined by the so-called dimensionless FEL parameter (or Pierce parameter), ρ, which for most practical cases is on the order of 0.1% (although it can be much smaller for very short wavelengths, such as hard X-rays, or significantly larger at longer/infrared wavelengths). Thus, the largest relative resonant energy variation allowed in a plain undulator before the beam falls out of resonance does not exceed ρ, whereby $\Delta\gamma_r/\gamma_r<\rho$. As the beam travels along the FEL undulator, its energy is transferred to radiation, and once it transfers a single factor of ρ, it is said that FEL is at saturation, and no further amplification is practical within the limits of the non-tapered undulator.

In order to extend the energy transfer beyond a factor of ρ, an undulator tapering technique is employed, where to compensate electron energy loss beyond the saturation point, the undulator strength K, is being gradually varied to maintain a resonant condition. In a conventional optimized tapered FEL an electron beam can lose about another factor of ρ, for each synchrotron oscillation period beyond saturation. In simulations it has been demonstrated that it is possible to keep the electron beam coasting in a tapered undulator for about 10 synchrotron oscillation periods beyond saturation. The following compares the TESSA undulator with a conventional tapered FEL undulator.

In reference to above description, it should be appreciated that qualitatively in a conventional tapered FEL undulator, an electron beam resonant energy variation does not exceed 10 ρ. However, in a TESSA undulator electron beam resonant energy variation is typically larger than 10 ρ and can often exceed 100 ρ. Quantitatively, for a broad range of parameters, in a conventional tapered FEL undulator, electron beam resonant energy variation is usually limited to a few percent, while in a TESSA undulator, electron beam resonant energy variation is typically larger than 5% and in many cases exceeds 50%. In the prior art, no such undulator has been described in this decelerator configuration.

Strong undulator tapering as discussed herein differs drastically from common adiabatic tapering, in which the magnetic field amplitude changes gently along the undulator, as in the conventional tapered FEL. In reference to the above descriptions, we consider relative changes in resonant energy over a characteristic distance in the interaction, which can be taken equal to the conventional FEL gain length or the longitudinal synchrotron oscillation period. Qualitatively, in a conventional optimized tapered FEL undulator, electron beam resonant energy varies at a rate of ρ, per each synchrotron oscillation period. In the TESSA undulator electron beam resonant energy varies at a rate of many times ρ per each synchrotron oscillation period.

Quantitatively, in the example of the EUV source (e.g., approximately 13 nm radiation wavelength), it has been shown in simulations that a conventional tapered FEL would enable extracting up to 1.5% of the electron beam energy in about a 50 meters long tapered undulator having a tapering rate of 0.03% per meter. In the example of TESSA, however, at the same operating conditions, it has been found in simulations that up to 50% of the electron beam energy can be extracted with a TESSA undulator of 15 meters length having a tapering rate of greater than 3% per meter. Such a strong undulator tapering function in a light source configuration is a unique characteristic of TESSA. This can be achieved by reducing the undulator period, the magnetic field amplitude, or by a combination of both.

In the example above, in terms of deceleration, a conventional FEL optimized for 13 nm EUV generation decelerates the beam with a rate of about 0.3 MeV/m. In the same example, TESSA decelerates the beam at a rate of 30 MeV/m.

In view of the discussion above it will be appreciated that TESSA provides some significant distinctions over state of the art systems utilizing undulators. The following are provided by way of example. (a) A TESSA configured undulator is characterized by a reduction in the resonant energy of the undulator by more than 5% from the entrance to the exit of the undulator, and it can often exceed as much as 50%. (b) Qualitatively, a TESSA configured undulator is characterized by a reduction in the resonant energy of the undulator by more than 10 times an equivalent electron beam energy loss in an optimized non-tapered FEL at saturation, and it can often exceed as much as 100 times. (c) A TESSA configured undulator is characterized by a tapering strength of more than 1% per meter, and it can often exceed as much as 10% per meter. (d) Qualitatively, a TESSA configured undulator is tapered in such way that per each synchrotron oscillation period the resonant energy of the undulator is reduced by a substantially larger fraction than an equivalent electron beam energy loss in an optimized non-tapered FEL at saturation. (e) A strong tapering in of the undulator is achieved by either reducing at every period the strength of the undulator field, or reducing at every period the length of the undulator period, or through the combination of both. (f) The exact geometry and field strength of the strong tapered undulator is preferably determined using GIT.

6. TESSA Applications

Semiconductor manufacturers are seeking to utilize extreme ultra-violet (EUV) radiation for lithography. Current pilot EUV lithography systems use laser produced plasma sources generating up to a few hundred watts in a granular configuration, that is to say one source per lithography tool. Free electron lasers are being actively considered as an alternative source technology in a non-granular configuration, having one source serving multiple lithography tools. When driven with a high repetition rate, linac, the FEL technology, can efficiently extract power from an electron beam and deliver EUV with the average power in excess of 10 kW. FEL technology implementation can offer lower operating costs and improved uptime for the future EUV lithography systems. Using TESSA in place of the conventional FEL can offer another order of magnitude improvement in cost and efficiency of the source. Also, just like FEL, TESSA is scalable in wavelength. It will be appreciated that the availability of suitable reflective optics at these shorter wavelengths, allows TESSA to be used to produce even shorter wavelength radiation, resulting in better resolution lithography and a reduction in the size of semiconductor elements.

In applying TESSA to short wavelengths, a source for the seed must be determined; and in many of these instances there is no availability of a high intensity short wavelength source. To overcome this, power refocusing (e.g., 10 GW) from FEL saturation is utilized in these embodiments of a high gain regime, so that as target radiation power levels increase, stronger tapers of the undulator are utilized whereby power can be extracted more efficiently. As previously described (e.g., FIG. 2 and FIG. 3), these sources can be applied for EUVL in either an oscillator configuration, or an afterburner configuration, such as following SASE. It will be noted that the afterburner configuration is simpler, requires only 10 GW of seed power, and requires the use of mirrors for refocusing radiation.

From the description herein, it will be appreciated that the present disclosure encompasses multiple embodiments which include, but are not limited to, the following:

1. A tapering enhanced stimulated superradiant amplification method, comprising: (a) generating an intense optical input seed pulse having an intensity exceeding free electron laser (FEL) saturation; (b) generating a relativistic beam; (c) directing said intense optical input seed pulse and said relativistic beam into a strongly tapered undulator; and (d) configuring said strongly tapered undulator to interoperate with the intense optical input seed pulse to maintain a resonant condition while compromising between deceleration and detrapping to extract high efficiency as a result of sharply decelerating electrons and taking advantage of produced radiation to further drive interaction toward increased overall radiation output, and intensely amplified optical pulse; (e) wherein said undulator is configured to provide a reduction in resonant energy exceeding between 5% and 50% from the entrance to the exit of the undulator.

2. The method of any preceding embodiment, wherein said strongly tapered undulator is configured with both period and magnetic field amplitude being tapered.

3. The method of any preceding embodiment, wherein said strongly tapered undulator is configured with either period or magnetic field amplitude being tapered.

4. The method of any preceding embodiment, wherein said strong tapering in said undulator is configured to have a tapering strength exceeding at least 1% per meter.

5. The method of any preceding embodiment, wherein said tapering enhanced stimulated superradiant amplification configured undulator is characterized by a reduction in resonant energy by more than 10 to over 100 times an equivalent electron beam energy loss in an optimized non-tapered FEL at saturation.

6. The method of any preceding embodiment, further configuring said relativistic beam as pre-bunched, or configuring said strongly tapered undulator with an entrance section configured for pre-bunching the relativistic beam.

7. The method of any preceding embodiment, wherein configuration of said strongly tapered undulator comprises processing motion equations for the electrons and Maxwell's field equations to determine laser fields produced in response to interaction.

8. The method of any preceding embodiment, wherein said configuration of said strongly tapered undulator is performed incrementally along the length of said strongly tapered undulator.

9. The method of any preceding embodiment, wherein during said processing motion equation radiation field strength seen by each electron is sampled in order to find a minimum field seen by most electrons in order to assure that they are kept in resonance with the radiation.

10. The method of any preceding embodiment, wherein said strongly tapered undulator is configured for reducing the energies of electrons, transferring energy from the electrons to add to optical energy being output.

11. The method of any preceding embodiment, wherein said resonant condition is maintained controlling the resonant energy so that the average phase of the electrons in the ponderomotive potential is stationary.

12. The method of any preceding embodiment, wherein said intense radiation pulse is obtained from a low repetition rate seed laser, or from the build-up in an oscillator configuration, or from refocusing radiation from an FEL after saturation.

13. The method of any preceding embodiment, wherein the strong input field can be obtained by using refocusing optics from an external seed laser, or a saturated FEL amplifier.

14. The method of any preceding embodiment, wherein said method can be operated in a high gain single pass regime, or a low gain oscillator type regime.

15. An undulator apparatus, comprising: (a) a first array of opposed magnet pairs having a given polarization; (b) a second array of opposed magnet pairs having a second polarization, wherein the magnetic field generated by said second array is superimposed to the magnetic field generated by said first array of opposed magnet pairs; (c) wherein said first and second arrays of opposed magnetic pairs are configured with strong tapering in which tapering strength, described by variation in undulator resonant energy, exceeds at least 1% per meter, which interoperates with a received input pulse energy whose intensity exceeds free electron laser (FEL) saturation; (d) wherein said undulator is configured to sharply decelerate input electrons to extract high efficiency, while maintaining a resonant condition, with radiation produced further driving interaction toward increased overall radiation output and intensely amplified optical pulse.

16. The apparatus of any preceding embodiment, wherein said undulator with strong tapering is configured for reducing resonant energy by more than 5% from the entrance to the exit of said undulator.

17. The apparatus of any preceding embodiment, wherein said undulator with strong tapering is configured to provide a reduction in undulator resonant energy by more than 10 times an equivalent electron beam energy loss in an optimized non-tapered FEL at saturation.

18. The apparatus of any preceding embodiment, wherein said strong tapering as is achieved in response to (a) reducing undulator field strength at every period, or (b) reducing undulator period length at every period of the undulator, or (c) through a combination of reducing undulator field strength and period length at every period of the undulator.

19. The apparatus of any preceding embodiment, further comprising utilizing a process for configuring the strong tapering of said undulator in response to steps comprising: (a) solving Maxwell and Lorentz force equations determining evolution of the electron beam distribution and radiation in the undulator over a small section of the undulator; and (b) processing particle and radiation files for each section of said undulator to extract field intensity seen by each particle; (c) using in reverse IFEL scaling for undulator field strength, or an undulator period length, or a combination of these two, as a function of optical field intensity, to determine taper for a subsequent undulator section to maintain resonance; and (d) repeating the process until total length of undulator is configured.

20. A tapering enhanced stimulated superradiant amplification method, comprising: (a) injecting an intense radiation seed pulse with intensity larger than free electron laser (FEL) saturation into an undulator; (b) tapering the period and the magnetic field amplitude of the undulator to establish a strongly tapered undulator that maintains a resonant condition and sustains a strong coupling to the laser; and (c) configuring the tapering to interoperate with said intense radiation seed pulse and to maximize extraction efficiency in relation to deceleration and detrapping; (d) wherein an output pulse is generated with an intensity greater than the intensity of the seed pulse and very high conversion efficiency.

21. The method of any preceding embodiment, further comprising obtaining the seed pulse from a low rep-rate seed laser.

22. The method of any preceding embodiment, further comprising obtaining the seed pulse from build-up on an oscillator.

23. The method of any preceding embodiment, further comprising obtaining the seed pulse by refocusing the FEL after saturation.

24. The method of any preceding embodiment, further comprising injecting a non-pre-bunched electron beam and using a short pre-buncher section at the beginning of the undulator.

25. The method of any preceding embodiment, further comprising directing a pre-bunched relativistic beam as input to said undulator.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Comparison of Tessa with Conventional Tapered FEL

| FEL | TESSA |
| --- | --- |
| Laser-beam interaction always occur at the laser intensity below or at FEL saturation level | Laser-beam interaction occurs at the laser intensity above FEL saturation level |
| FEL can be seeded by external source or via self-amplified spontaneous emission | TESSA is either seeded by external source (which could also be a refocused upstream FEL source), or with the prebunched electron beam |
| A conventional tapered FEL amplifier usually involves very gradual tapering, to keep electron beam radiating within FEL bandwidth as it is coasting along the tapered undulator sections and slowly looses energy | TESSA amplifier uses a very aggressive tapering from the onset, and it is the essential feature of the device. The electron beam looses a considerable fraction of its energy in each undulator section. |
| In a conventional FEL (tapered or untapered) the characteristic interaction length (i.e. power gain length) is typically on the order of 10-100 undulator periods, and FEL dynamics is often fully characterized with the period averaged variables. | In TESSA the characteristic interaction length is a single undulator period, and beam capture and deceleration are defined by a single period dynamics. TESSA has to be configured period-by-period. |
| Conventional FEL efficiency is very sensitive to the beam quality; only a part of the electron beam phase space, which fits with the FEL separatrix, participates in the FEL process. | TESSA is a much strong interaction with a large separatrix volume, often significantly exceeding the phase space volume of the entire beam. Often, TESSA is less sensitive to the emittance and energy spread of the beam. |
| Conventional FEL (even when tapered) only deals with the e-beam energy variations of up to few %. | TESSA is designed for electron beam deceleration of as much as 50%. |

TABLE 2

Parameters for TESSA of FIG. 7A-7B at EUV 13.5 nm

| E-beam energy | 1 → 0.35 GeV |
| --- | --- |
| E-beam current | 3 kA |
| E-beam emittance | 0.5 mm-mrad |
| E-beam spot size | 18 μm |
| Laser Power | 5 GW → 1.5 TW |
| Seed Rayleigh Range | 1 m |
| Seed Waist | 3 m |
| Resonant Phase | −1.00 → −0.78 |
| Undulator Period | 2.3 → 1.2 |
| Undulator K | 1.83 → 0.3 |
| Undulator Length | 15 m |

TABLE 3

Parameters for TESSA of FIG. 10A-10D at 3 Å

| E-beam energy | 14.35 → 11.84 GeV |
| --- | --- |
| E-beam current | 4 kA |
| E-beam emittance | 0.3 mm-mrad |
| E-beam spot size | 9 μm |
| Laser Power | 5 MW → 10 TW |
| Undulator Period | 3.34 → 2.91 cm |
| Undulator K | 3.63 → 2.86 |
| Undulator Length | 80 m |

TABLE 4

Parameters for TESSA of FIG. 11A-11C at 10 μm

| | |
|---|---|
| E-beam energy | 70 → 42 MeV |
| E-beam current | 1 kA |
| E-beam emittance | 2 mm-mrad |
| E-beam spot size | 200 μm |
| Laser Power | 100 GW → 120 GW |
| Undulator Period | 6 → 4 cm |
| Undulator K | 2.4 → 1.4 |
| Undulator Length | 50 cm |

TABLE 5

Parameters for TESSA of FIG. 12A-12D at 266 nm

| | |
|---|---|
| E-beam energy | 300 → 250 MeV |
| E-beam current | 1 kA |
| E-beam emittance | 2 mm-mrad |
| E-beam spot size | 200 μm |
| Laser Power | 1 GW → 20 GW |
| Undulator Period | 2.75 → 2.55 cm |
| Undulator K | 2.7 → 2.2 |
| Undulator Length | 5 m |

Table 6

Contained in Computer Program Appendix

Table 7

Contained in Computer Program Appendix

What is claimed is:

1. A tapering enhanced stimulated superradiant amplification method, comprising:
   (a) generating an intense optical input seed pulse having an intensity exceeding free electron laser (FEL) saturation;
   (b) generating a relativistic beam;
   (c) directing said intense optical input seed pulse and said relativistic beam into a strong tapered undulator, said undulator having an entrance and an exit, said undulator having a tapering strength that exceeds at least 1% per meter; and
   (d) configuring said strongly tapered undulator to interoperate with the intense optical input seed pulse to maintain a resonant condition while making a compromise between deceleration and detrapping to extract efficiency as a result of sharply decelerating electrons and utilizing produced radiation to further drive interaction toward increased overall radiation output, and intensely amplified optical pulse;
   (e) wherein said undulator is configured to provide a reduction in resonant energy by more than 5% from the entrance to the exit of the undulator.

2. The method as recited in claim 1, wherein said strong tapered undulator is configured with both period and magnetic field amplitude being tapered.

3. The method as recited in claim 1, wherein said strong tapered undulator is configured with either period or magnetic field amplitude being tapered.

4. The method as recited in claim 1, wherein said tapering enhanced stimulated superradiant amplification configured undulator is characterized by a reduction in resonant energy by more than 10 times an equivalent electron beam energy loss in an optimized non-tapered FEL at saturation.

5. The method as recited in claim 1, further configuring said relativistic beam as pre-bunched, or configuring said strong tapered undulator with an entrance section configured for pre-bunching the relativistic beam.

6. The method as recited in claim 1, wherein configuration of said strong tapered undulator comprises processing motion equations for the electrons and Maxwell's field equations to determine laser fields produced in response to interaction of a relativistic beam and electromagnetic radiation in said strong tapered undulator.

7. The method as recited in claim 6, wherein said configuration of said strong tapered undulator is performed incrementally along the length of said strongly tapered undulator.

8. The method as recited in claim 6, wherein during said processing motion equation radiation field strength seen by each electron is sampled in order to find a minimum field seen by most electrons in order to assure that they are kept in resonance with the radiation.

9. The method as recited in claim 1, wherein said strong tapered undulator is configured for reducing the energies of electrons, transferring energy from the electrons to add to optical energy being output.

10. The method as recited in claim 1, wherein said resonant condition is maintained controlling the resonant energy so that average phase of the electrons in ponderomotive potential is stationary.

11. The method as recited in claim 1, wherein an intense radiation pulse is obtained from a low repetition rate seed laser, or from the build-up in an oscillator configuration, or from refocusing radiation from an FEL after saturation.

12. The method as recited in claim 1, wherein a strong intensity input field, beyond that of a non-tapered FEL saturation intensity, can be obtained by using refocusing optics from either an external seed laser, or a saturated FEL amplifier.

13. The method as recited in claim 1, wherein said method can be operated in a high gain single pass regime, or a low gain oscillator type regime.

14. An undulator apparatus, comprising:
   a first array of opposed magnet pairs having a given polarization;
   a second array of opposed magnet pairs having a second polarization;
   wherein the magnetic field generated by said second array is superimposed to the magnetic field generated by said first array of opposed magnet pairs;
   wherein said first and second arrays of opposed magnetic pairs are configured with strong tapering in which tapering strength, described by variation in undulator resonant energy, exceeds at least 1% per meter, which interoperates with a received input pulse energy whose intensity exceeds free electron laser (FEL) saturation; and
   wherein said undulator is configured to decelerate input electrons to extract efficiency, while maintaining a resonant condition, with radiation produced further driving interaction toward increased overall radiation output and intensely amplified optical pulse.

15. The apparatus as recited in claim 14, wherein said undulator with strong tapering is configured for reducing resonant energy by more than 5% from the entrance to the exit of said undulator.

16. The apparatus as recited in claim 14, wherein said undulator with strong tapering is configured to provide a reduction in undulator resonant energy by more than 10 times an equivalent electron beam energy loss in an optimized non-tapered FEL at saturation.

17. The apparatus as recited in claim 14, wherein said strong tapering as is achieved in response to (a) reducing undulator field strength at every period, or (b) reducing undulator period length at every period of the undulator, or (c) through a combination of reducing undulator field strength and period length at every period of the undulator.

18. The apparatus as recited in claim 14, further comprising utilizing a process for configuring the strong tapering of said undulator in response to steps comprising:

solving Maxwell and Lorentz force equations determining evolution of the electron beam distribution and radiation in the undulator over a small section of the undulator;

processing particle and radiation files for each section of said undulator to extract field intensity seen by each particle;

using in reverse IFEL scaling for undulator field strength, or an undulator period length, or a combination of these two, as a function of optical field intensity, to determine taper for a subsequent undulator section to maintain resonance; and repeating the process until total length of undulator is configured.

19. A tapering enhanced stimulated superradiant amplification method, comprising:

injecting into an undulator an intense radiation seed pulse with intensity larger than the output intensity of non-tapered free electron laser (FEL) at saturation;

tapering the period and the magnetic field amplitude of the undulator to establish a strongly tapered undulator, having tapering strength that exceeds at least 1% per meter, that maintains a resonant condition and sustains a continuous electron beam and laser interaction; and configuring the tapering to interoperate with said intense radiation seed pulse and to maximize extraction efficiency in relation to deceleration and detrapping;

wherein an output radiation pulse is generated with an intensity greater than the intensity of the seed pulse and the decelerated electrons to radiated light energy conversion efficiency exceeds at least 5%.

20. The method as recited in claim 19, further comprising obtaining the seed pulse from a low rep-rate seed laser.

21. The method as recited in claim 19, further comprising obtaining the seed pulse from build-up on an oscillator.

22. The method as recited in claim 19, further comprising obtaining the seed pulse by refocusing the FEL after saturation.

23. The method as recited in claim 19, further comprising injecting a non-pre-bunched electron beam and using a short pre-buncher section at the beginning of the undulator.

24. The method as recited in claim 19, further comprising directing a pre-bunched relativistic beam as input to said undulator.

* * * * *